Figure 1:
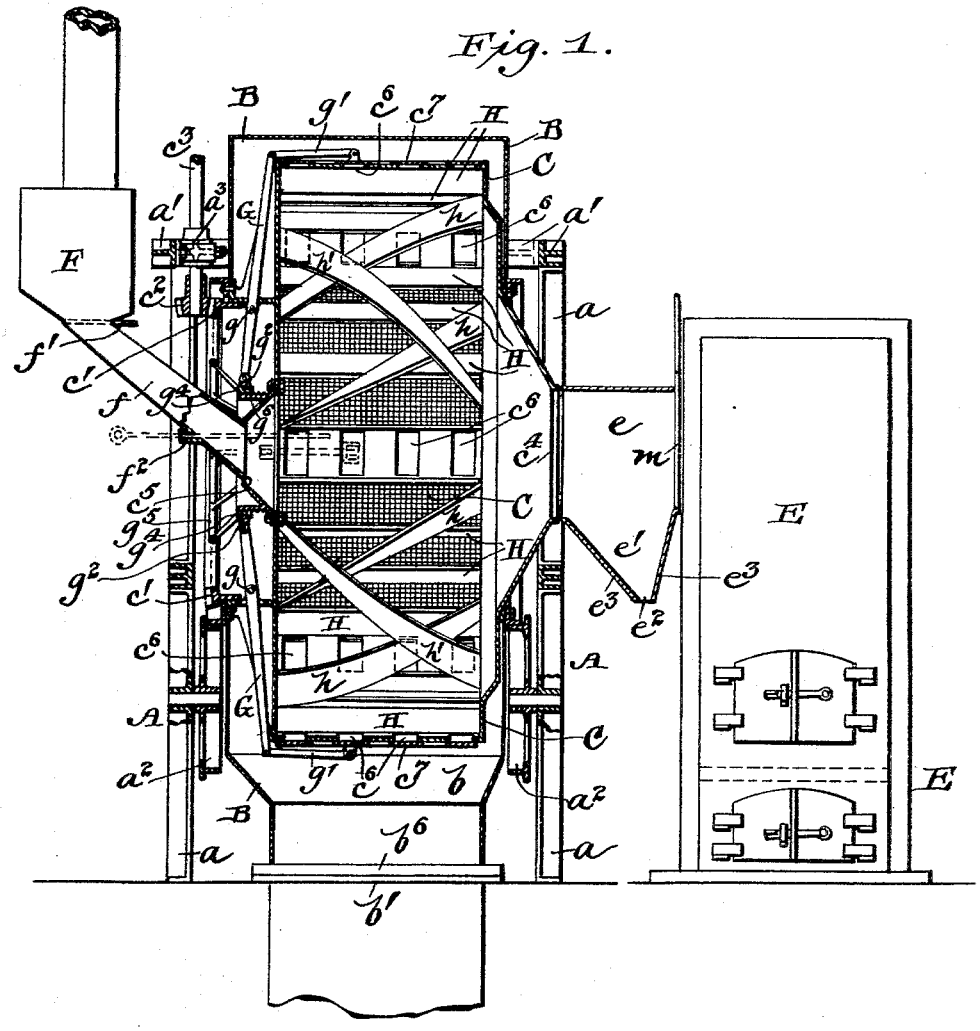

(No Model.)  3 Sheets—Sheet 1.

J. R. OKELL.
APPARATUS FOR ROASTING COFFEE.

No. 593,163. Patented Nov. 2, 1897.

WITNESSES

INVENTOR
John R. Okell

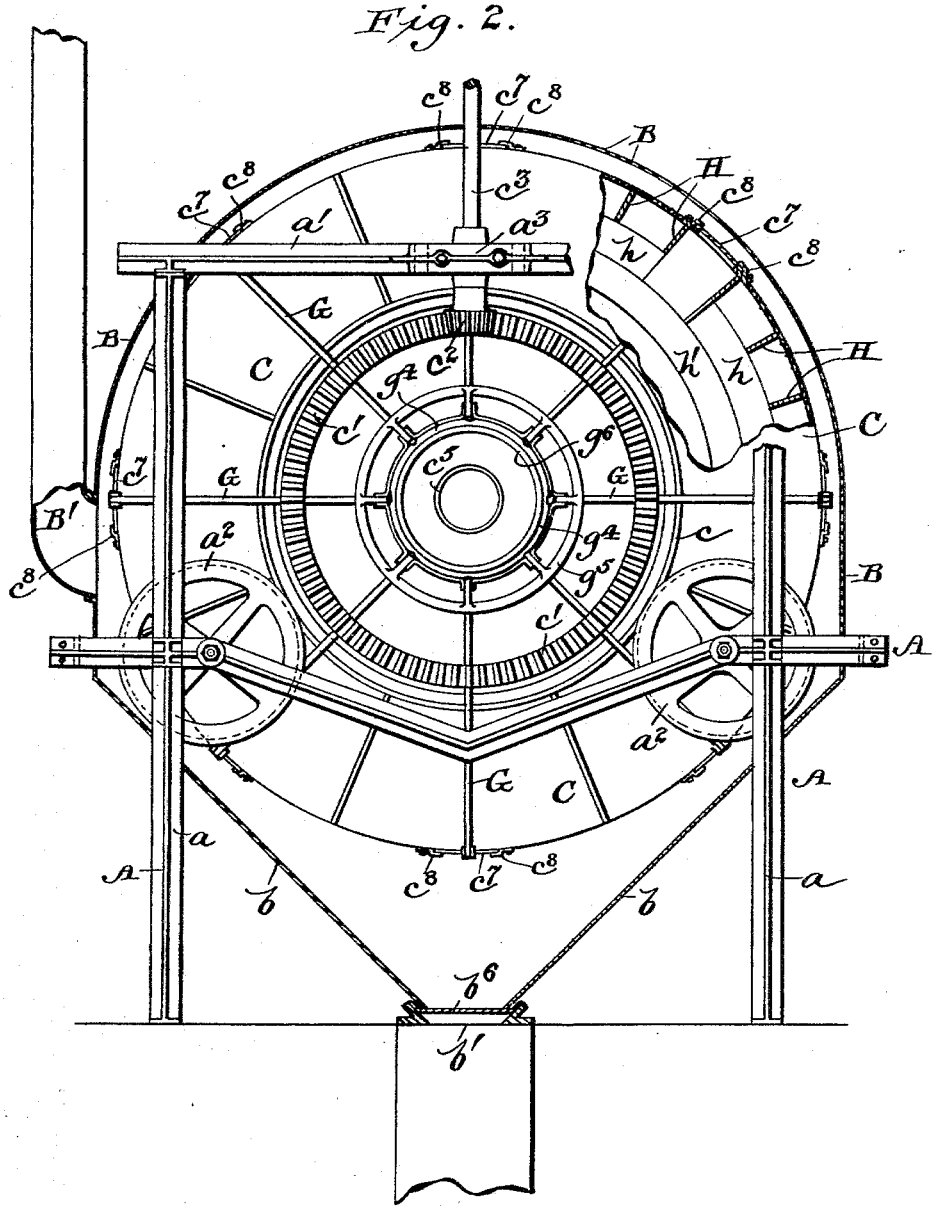

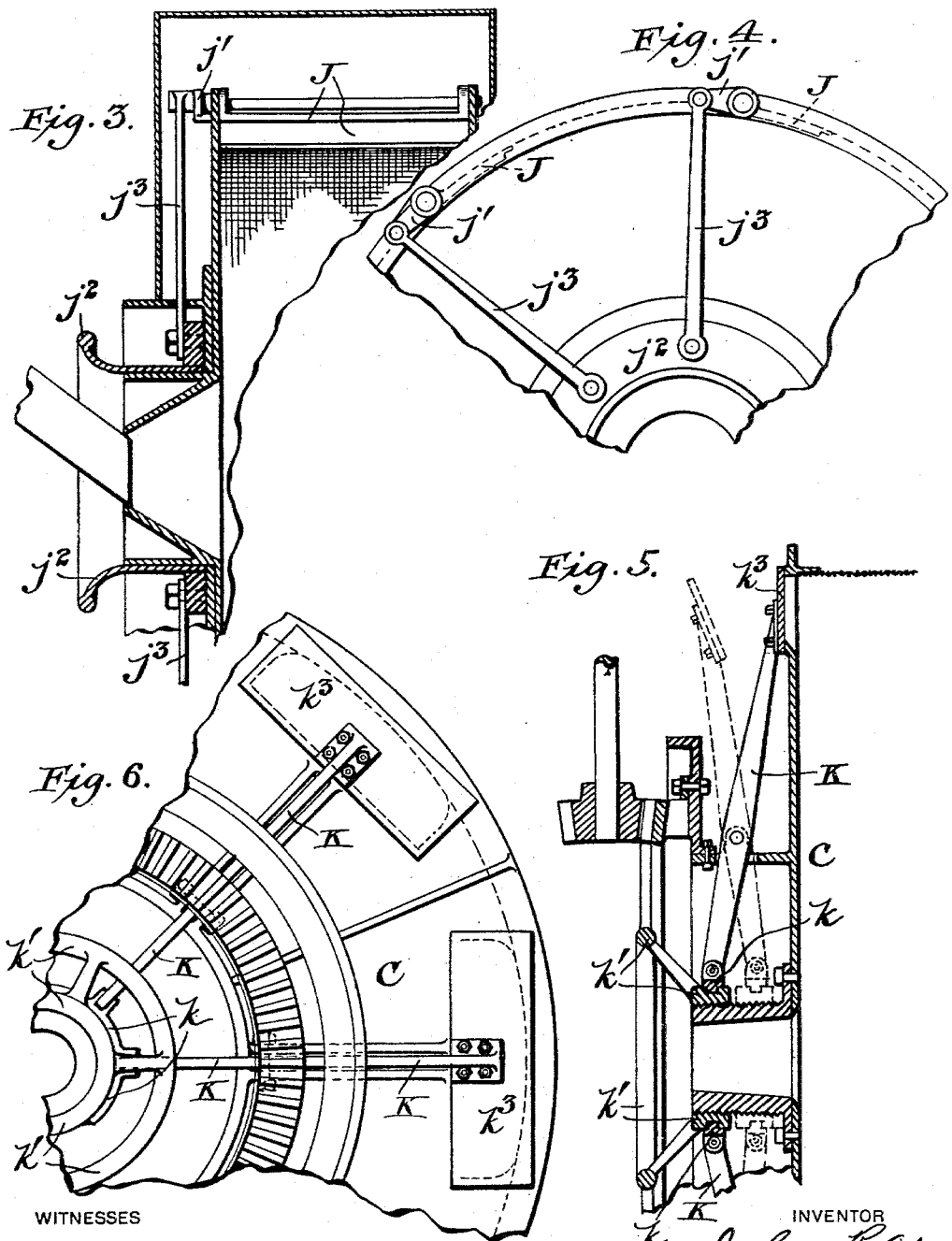

UNITED STATES PATENT OFFICE.

JOHN R. OKELL, OF PHILADELPHIA, PENNSYLVANIA.

APPARATUS FOR ROASTING COFFEE.

SPECIFICATION forming part of Letters Patent No. 593,163, dated November 2, 1897.

Application filed February 24, 1897. Serial No. 624,900. (No model.)

*To all whom it may concern:*

Be it known that I, JOHN R. OKELL, a citizen of the United States, residing at Philadelphia, in the county of Philadelphia and State of Pennsylvania, have invented certain new and useful Improvements in Apparatus for Roasting Coffee; and I do hereby declare the following to be a full, clear, and exact description of the invention, such as will enable others skilled in the art to which it appertains to make and use the same.

My invention relates to improvements in apparatus for roasting coffee, the invention having reference particularly to that class of coffee-roasters which are adapted to roast coffee by agitating the same in a revolving drum or chamber heated by a suitable furnace having a combustion-chamber immediately adjoining the roasting-drum of the roaster, the roasting-drum being of novel construction and having interiorly-arranged agitators or lifters for carrying the coffee up and causing it to fall in a shower through the center of the roasting-drum; and it consists, first, in a coffee-roaster, the combination of a furnace having a combustion-chamber immediately adjoining the roasting-drum of said roaster, a cylindrical revoluble roasting-drum having a mouth opening directly into the interior of the drum and communicating directly with the interior of the combustion-chamber of the furnace, said drum being very shallow in depth but of a relatively large diameter, and lifting-agitators arranged within the drum for agitating the coffee.

It consists, second, in the combination of parts including a suitable casing approximately closed to the atmosphere, a revoluble drum mounted therein and having discharge-openings preferably in its periphery for discharging the coffee, when desired, levers for covering said discharge-openings, means for actuating said levers, and means for supplying heat to the interior of said drum into direct contact with the coffee.

It consists, third, of novelly constructed and arranged lifting and deflecting means arranged within the drum for carrying the coffee up to a considerable height and allowing it to fall in a shower through the center of the drum; and it consists of certain other novel constructions, combinations, and arrangements of parts, as will be hereinafter described and claimed.

In the accompanying drawings, forming a part of this specification, Figure 1 is a central vertical transverse view of my improved coffee-roaster. Fig. 2 is a side elevation of the same, some of the parts being shown in section. Fig. 3 is a central vertical sectional view of a device constructed in accordance with my invention, showing another manner of discharging the coffee from the drum. Fig. 4 is a side elevation of the roasting-drum, showing the improved means for operating the discharging means. Fig. 5 is a vertical central sectional view of a portion of the drum, showing another way of discharging the coffee; and Fig. 6 is a detail side elevation of a portion of said drum, showing the above improved form.

A in the drawings represents a suitable framework; B, a casing mounted thereon; C, a revolving drum, and E a heating-furnace.

The frame A is preferably formed of supporting-columns $a\ a$, connected at their upper ends by cross-bars $a'\ a'$. Within the framework A is constructed the casing B, which is entirely closed to the atmosphere and is adapted to completely surround the revolving drum and is provided with lower converging divergent sides $b\ b$, leading to a suitable discharge, as at $b'$. The revolving drum C is constructed of suitable metal and the diameter of the drum is preferably greater than the length of the drum.

Secured to each end of the drum are annular bearing-rings $c\ c$, bolted or otherwise secured to the said drum. These bearing-rings are adapted to rest upon suitable rollers or wheels $a^2\ a^2$, pivotally mounted upon the frame A. These rollers are preferably flanged and, as shown in the drawings, are two in number upon each side of the frame for supporting the respective rings $c\ c$. It will thus be seen that the drum is free to revolve upon said rollers.

In order to actuate the drum, any suitable connecting operating means may be employed; but I preferably use, as shown in the drawings, a bevel-gear $c'$, secured to one end of the drum, which meshes with a bevel-pinion $c^2$, secured upon a revolving shaft $c^3$. The shaft $c^3$ is mounted upon the frame A by a suitable bearing, as $a^3$, and is connected with any suitable means for giving it motion. The drum C is provided upon one side with a central opening, as $c^4$, for the admission of heat from a suitable heat-supply, and from this point flares outwardly to spread through the entire drum in contact with a shower of falling coffee and upon its other side with a central opening $c^5$, through which the coffee to be roasted may be admitted to said drum. In order to do this in a proper manner and to regulate the discharge of the coffee in the said drum, I preferably provide a hopper F, provided with a discharge-pipe $f$, leading to the mouth of the opening $c^5$. The hopper F may be provided with a slide or valve $f'$ at its lower end for regulating the discharge of the coffee from the same. In order to test the coffee, I provide the pipe $f$ with a suitable opening, as $f^2$, in which a testing implement may be inserted at any time to withdraw some of the grains of coffee and inspect its condition.

The heat supplied to the drum through the opening $c^4$ at one end is generated in a furnace E of suitable size. This furnace is preferably constructed with an extra-large combustion-chamber without a chimney, and in such a way that all gases, as well as every product of combustion, will be thoroughly consumed, causing a very great heat. This heat is adapted to be delivered into the drum through the pipe or chute $e$, leading to the mouth of the opening $c^4$ in the drum C, directly in contact with a shower of falling coffee, the heat being confined by reason of the fact that the outer casing is entirely closed to the atmosphere. I preferably construct this chute or pipe $e$ with a hopper-shaped lower side, as $e'$, the divergent sides $e^3 e^3$ of which terminate in the small opening $e^2$, as illustrated. I have found that in revolving the drum grains of coffee are sometimes thrown through the opening $c^4$, and I provide this hopper with its divergent sides in the chute $e$, in order to prevent the coffee thus thrown out of the cylinder from going into the furnace and being burned or destroyed. What falls into the hopper will pass through the opening $e^2$ and may be collected in any suitable vessel or receptacle.

A very important feature of my drum is the means for discharging the coffee when desired from suitable points in the periphery. In providing for this feature I preferably construct the drum with suitable apertures or openings $c^6 c^6$ at intervals in the periphery of the drum. In order to control the discharge of the coffee through these apertures, I provide sliding gates or doors $c^7 c^7$, movably secured upon the exterior of the drum. These doors $c^7 c^7$ slide in grooves or ways, as $c^8 c^8$, formed on the periphery of the drum. In order to operate the doors, I provide levers G G, pivotally mounted upon one end of the drum, as at $g g$, the outer ends of said levers being connected to the doors by links $g' g'$. The inner end of these levers G G are secured to a ring $g^2$, which engages an annular groove in the internally-threaded ring $g^4$. The ring $g^4$ is internally threaded and works upon a cylindrical extension $g^6$, formed upon the end of the drum C, and is screw-threaded externally to engage the threads of the ring $g^4$. The ring $g^4$ is provided with a hand operating-ring $g^5$, whereby it may be rotated to move the ring $g^4$ back and forth upon the thread of the extension $g^6$, according as it is desired to open or close the doors upon the periphery of the drum. It will be seen that by these means I am enabled to open the discharge-apertures while the drum is in motion at any time and that all the apertures are adapted to be opened at the same time and that they can be closed again in the same manner. The intermediate portion of the periphery of the drum between the discharge-openings is preferably formed of wire-screen or similar material preferably provided with perforations, so that as the coffee is agitated in the drum the chaff and similar foreign substance may drop through said screen into the casing B.

In the bottom of the casing B, I preferably cover the discharge-opening by placing a tray $b^6$ in said opening to collect the chaff and other foreign substance. Sometimes this chaff catches on fire in extreme heat, which is not desirable, and in order to prevent this possibility I contemplate filling the tray $b^6$ with water. Of course when it is desired to discharge coffee from the periphery it is necessary to remove the tray from over the discharge-opening in the casing B. When the tray is removed and the coffee is being discharged from the drum, a damper $m$, provided in the pipe or chute $e$, is operated to close said chute, thus preventing the heat and flame from entering the drum.

The interior surface of the drum is preferably provided with a series of deflecting-agitators preferably arranged parallel and extending lengthwise of the drum. These serve to carry the coffee up a considerable distance upon the revolving drum and are continually discharging their contents back into the lower part of said drum through the center of the same. In order to more thoroughly mix the coffee and spread it more effectively through the heat in said drum, I also provide spirally-arranged deflectors $h$ $h$, secured across the inner edges of the deflecting-agitators H H. I also arrange still a third series of deflectors $h' h'$, which are spirally disposed and secured to the inner edges of the spiral agitators $h$ $h$, but extending in an opposite direction to the same. It will be apparent from this construction that I am enabled to keep a constant shower of coffee thrown in different directions passing through the strong heat maintained in the drum, and in this manner I am enabled to thoroughly roast the coffee. The deflectors also serve to polish the coffee and knock off the chaff or scaly portions that may be left upon the same. The casing B is provided upon one side with an outlet leading to a flue B'. This flue is preferably made small compared with the size of the chute for the entrance of the hot air, so that the hot air will remain in the casing and drum as long as possible before it can escape through the flue B', the casing B, and consequently the drum C, being otherwise substantially closed to the atmosphere.

As shown in Figs. 3 and 4, I may, in place of the sliding doors above described, use hinged doors, as J, placed at suitable points upon the periphery of the drum. These doors are provided at one end with cranks J', which cranks are adapted to be operatively connected with the hand revolving ring $j^2$ by suitable links $j^3 j^3$. It will be seen that by this mechanism it is only necessary to turn the hand-ring in order to draw the links inward, which, through the agency of the cranks, oscillate the doors on the periphery of the drum, so as to discharge the contents thereof.

In Figs. 5 and 6 I have shown another manner by which the coffee may be discharged. In this form the levers K K are pivotally mounted on the end of the frame, their inner ends being connected to a ring $k$, engaging an annular groove upon a hand-wheel $k'$. This hand-wheel $k'$ is provided with internal threads engaging threads upon a cylindrical extension secured to the end of the drum. The outer ends of the levers K carry the doors or levers $k^3$ thereof and are adapted to close openings in the end of the drum at the periphery thereof. It will be seen that by revolving the hand-wheel these doors may be opened or closed, as desired.

After considerable experimenting I have found the construction of the roaster and furnace shown in the accompanying drawings to be the most practical and efficient for readily and thoroughly roasting large quantities of coffee, the main features of the construction and arrangement being the employment of a cylindrical revolving roasting-drum having a flaring mouth opening directly into the interior of the drum and communicating directly with the interior of the combustion-chamber of the furnace and having said drum approximately very shallow in depth, but of a relatively large diameter, and constructing and arranging the agitators or lifters within the drum so as to carry the coffee up to a considerable height and allow it to fall in a shower through the center of the drum and subject it while falling to the action of intense heat and flames direct from the furnace. In actual practice the combustion-chamber of the furnace is relatively only about nine inches from the heat-entrance to the revolving drum, and the drum is only about twenty-four inches in depth, while in diameter it is relatively about six feet.

Having now described my invention, what I claim as new, and desire to secure by Letters Patent, is—

1. In a coffee-roaster, the combination of a furnace having a combustion-chamber immediately adjoining the roasting-drum of said roaster, a cylindrical, revoluble roasting-drum having a flaring mouth opening directly into the interior of the drum and communicating directly with the interior of the combustion-chamber of the furnace, said drum being approximately very shallow in depth but of a relatively large diameter, lifting agitators or pockets arranged within the drum for carrying the coffee up to a considerable height and allowing it to fall in a shower through the center of the drum and through the flames and heat direct from the furnace, substantially as described.

2. In a coffee-roaster, the combination of a furnace having a combustion-chamber immediately adjoining the roasting-drum of said roaster, a cylindrical, revoluble roasting-drum having a mouth opening directly into the interior of the drum and communicating with the interior of the combustion-chamber of the furnace, said drum being approximately very shallow in depth but of a relatively large diameter, lifting agitators or pockets arranged around the inner periphery of the drum for carrying the coffee up and causing it to fall in a shower through the center of the drum and through the flames and intense heat direct from the furnace, and a casing inclosing the drum which casing is provided with a stack, substantially as described.

3. In a coffee-roaster, the combination of a furnace having a combustion-chamber of unusually large size immediately adjoining the roasting-drum of said roaster, a cylindrical, revoluble roasting-drum having a flaring mouth opening directly into the interior of the drum and communicating directly with the interior of the combustion-chamber of the furnace, said drum being approximately very shallow in depth but of a relatively large diameter, lifting agitators or pockets arranged around the inner periphery of the drum for carrying the coffee up and causing it to fall in a shower through the center of the drum and through the flames and intense heat direct from the furnace, additional agitators for deflecting the coffee as it falls from the lifting agitators or pockets, and a casing inclosing the drum, which casing is provided with a stack, and a damper or gate located between the furnace and the drum for cutting off communication between the same, substantially as described.

4. In a coffee-roaster, the combination of a furnace having a combustion-chamber of unusually large size, a revoluble roasting-drum closed to the atmosphere but open at one end for the admission of flames and heat directly from the furnace and agitating lifters or pockets arranged around the inner periphery of the drum for carrying the coffee up, a series of agitators extending across the lifting agitators in a spiral direction combining with said latter agitators to cause the coffee to fall in a shower through the center of the drum, and a casing inclosing the drum which is provided with a stack, the construction and arrangement being such that all flames and heat pass directly from the furnace into the drum and through the falling coffee before passing out the stack in the casing, substantially as described.

5. In a coffee-roaster, the combination of a furnace, having a combustion-chamber of unusually large size, a revoluble roasting-drum closed to the atmosphere but open at one end for the admission of flames and heat directly from the furnace, a series of agitating lifters or pockets arranged around the inner periphery of the drum for carrying the coffee up, a second series of agitators extending across the lifting-agitators in a spiral direction and a third series of agitators extending across the lifting agitators or pockets but in an opposite direction to the second series, the spirally-arranged agitators combining with the lifting-agitators to cause the coffee to fall in a shower through the center of the drum, and a casing inclosing the drum which is provided with a stack, the construction and arrangement being such that all the flame and heat pass directly from the furnace into the drum and through the falling coffee before passing out at the stack in the casing, substantially as described.

6. In a coffee-roaster, the combination of a revoluble drum, means for admitting hot air to one end of the said drum, means for charging said drum with coffee at the other end, discharge-openings in the periphery of said drum and doors for controlling the said discharge-openings, levers mounted upon one end of the drum for opening said doors, and means for actuating the said levers, substantially as described.

7. In a coffee-roaster, the combination of a revoluble drum, means for revolving the same, means for heating the drum, agitators for lifting the coffee, arranged around the inner side of the periphery of the drum and forming pockets, a second series of agitators extending spirally across the first set of lifting-agitators for deflecting the coffee as it falls, substantially as described.

8. In a coffee-roaster, the combination of a revoluble drum, means for heating the same, a series of agitators on the inner side of the periphery of the drum, a second series of agitators spirally arranged across the first set of agitators, and a third set of agitators spirally arranged across the second set of agitators, but in an opposite direction to said second set, substantially as described.

9. In a coffee-roaster, the combination of a revoluble drum provided with annular bearing-rings, a casing for entirely inclosing the drum from the atmosphere and provided with a stack, rollers exterior to said casing for supporting said bearing-rings and gearing secured to the end of said drum, means for revolving the same, lifting agitators or pockets arranged around the inner periphery of the drum, a second series of agitators spirally arranged across the lifting agitators or pockets, and a third series of agitators spirally arranged across the second series of agitators but in an opposite direction to said second series, a furnace arranged at one end of the drum for throwing flames and heat directly into the interior of the drum, and a damper interposed between the furnace and the drum for regulating the supply of heat to the drum, the construction and arrangement being such that the heat and flames pass directly from the furnace into the drum through the falling coffee and out at the stack in the casing, substantially as described.

10. In a coffee-roaster, the combination of a furnace having a combustion-chamber immediately adjoining the roasting-drum of said roaster, a cylindrical, revoluble roasting-drum having a flaring mouth opening directly into the interior of the drum and communicating directly with the interior of the combustion-chamber of the furnace, said drum being approximately very shallow in depth but of a relatively large diameter, and said drum also provided with discharge-openings in its periphery, doors for closing said openings, levers for operating the doors while the drum is revolving, and means for operating the levers while the drum is revolving, a casing entirely inclosing the drum from the atmosphere provided with a stack and formed with lower converging sides leading to a suitable discharge-opening, a tray in said casing arranged over said discharge-opening, lifting agitators or pockets arranged within the drum for carrying coffee up to a considerable height and allowing it to fall in a shower through the center of the drum and through the flames and heat from the furnace, substantially as described.

11. In a coffee-roaster, the combination of a revoluble drum, means for supplying coffee to the same, a furnace for supplying heat to said drum, and a connecting heat-chute having diverging sides leading to a discharge-opening, whereby any grains of coffee thrown from the drum may be collected and prevented from entering the furnace, substantially as described.

12. In a coffee-roaster, the combination of a furnace having a combustion-chamber immediately adjoining the roasting-drum of said roaster, a cylindrical, revoluble roasting-drum having a mouth opening directly into the interior of the drum and communicating directly with the interior of the combustion-chamber of the furnace, said drum being approximately very shallow in depth but of a relatively large diameter, and coffee-agitators arranged within the drum, substantially as described.

In testimony whereof I affix my signature in presence of two witnesses.

JOHN R. OKELL.

Witnesses:
A. L. KENT,
G. M. BORST.